United States Patent [19]
Hardt et al.

[11] Patent Number: 4,931,369
[45] Date of Patent: Jun. 5, 1990

[54] CONTACT ARRANGEMENT FOR THE BATTERY OF AN IN-EAR HEARING AID

[76] Inventors: Heinz Hardt, Hirschengasse 9, A-1060 Vienna; Rudolf Wandle, Jagerstrasse 24, A-1200 Vienna, both of Austria

[21] Appl. No.: 404,850

[22] Filed: Sep. 8, 1989

[30] Foreign Application Priority Data

Sep. 29, 1988 [AT] Austria ................................ 2404/88

[51] Int. Cl.⁵ .............................................. H01M 2/10
[52] U.S. Cl. .......................................... 429/98; 429/1; 429/100; 429/123
[58] Field of Search ............................... 429/96–100, 429/123; 439/366, 500; 381/69.2

[56] References Cited

U.S. PATENT DOCUMENTS

| | | | |
|---|---|---|---|
| 2,980,753 | 4/1961 | Nolter | 429/98 |
| 3,701,862 | 10/1972 | Vignini | 429/97 |
| 4,371,594 | 2/1983 | Ohara et al. | 429/97 |

FOREIGN PATENT DOCUMENTS

WO86/06919 11/1986 PCT Int'l Appl. .
528198 10/1972 Switzerland .

*Primary Examiner*—Anthony Skapars
*Attorney, Agent, or Firm*—Kurt Kelman

[57] ABSTRACT

A contact arrangement in a housing including a cover, the housing and cover defining a battery chamber having an opening closable by the cover, the chamber having dimensions substantially corresponding to the dimensions of a button battery to be received in the chamber through the opening thereof, and the battery having a negative pole and a positive pole, which comprises two contact elements arranged within the battery chamber to contact the battery poles. One of the contact elements is a pre-tensioned V-shaped spring having two legs arranged to be pressed apart against the tensioning bias of the spring by the battery upon insertion of the battery into the chamber through the opening thereof, and one of the spring legs is arranged opposite the opening and biases the inserted battery into a predetermined position in the chamber. The other contact element is arranged in the range of a free end of the other spring leg and insulated therefrom.

12 Claims, 2 Drawing Sheets

4,931,369

CONTACT ARRANGEMENT FOR THE BATTERY OF AN IN-EAR HEARING AID

BACKGROUND OF THE INVENTION (1) Field of the Invention

The present invention relates to a contact arrangement in a housing including a cover, the housing and cover defining a battery chamber having an opening closable by the cover, the chamber having dimensions substantially corresponding to the dimensions of a button battery to be received in the chamber through the opening thereof, and the battery having a negative pole and a positive pole constituted, respectively, by a casing and a cover, the contact arrangement comprising two contact elements arranged within the battery chamber to contact the battery poles, and one of the contact elements being a pre-tensioned V-shaped spring having two legs arranged to be pressed apart against the tensioning bias of the spring by the battery upon insertion of the battery into the chamber through the opening thereof, one of the spring legs being arranged opposite the opening and biasing the inserted battery into a predetermined position in the chamber. Such arrangements are used particularly in in-ear hearing aids.

(2) Description of the Prior Art

A contact arrangement of this type has been disclosed, for example, in Swiss patent No. 528,198. In this known contact arrangement, the V-shaped contact spring is in contact with a center portion of an end face of the battery. When the battery has been inserted into the battery chamber and the cover has been closed, it is clamped between the contact spring and the cover, the other battery pole being in contact with a conducting plate in the cover. The cover is connected to the housing by a bayonet joint formed by bent ends of the V-shaped spring and a further spring.

This contact arrangement has the disadvantage that the two contact elements are arranged in two separate parts, which causes problems in connecting the springs to the conducting plate, which must be effected by additional contacts led through the bayonet joint. This produces a correspondingly large number of contact points, which becomes problematic when the contact arrangement is used in a low-voltage circuit, such as in hearing aids.

Another contact arrangement is known from PCT application No. WO 86/0619, published Nov. 20, 1986, which discloses a pivotal battery drawer holding the battery and requiring two separate spring contacts arranged separately in the battery chamber. One of the spring contacts is V-shaped. The disadvantage of this contact arrangement is the complex shape of the relatively large contacts and the complicated holders therefor. In addition, the pivotal arrangement of the battery drawer is structurally involved and requires extra space to permit pivoting of the drawer.

SUMMARY OF THE INVENTION

It is the primary object of this invention to avoid these and other disadvantages, and to provide a contact arrangement of the first-indicated type which permits a space-saving arrangement for the battery while enabling the same to be readily inserted and removed into and out of contact with the contact arrangement because of the very simple construction.

The above and other objects are accomplished by the invention by arranging the other contact element in the range of a free end of the other spring leg and insulated therefrom.

This structure enables the battery simply to be placed between the legs of the V-shaped spring contact element whereby the required contact pressure is automatically generated by pressing the spring apart against its pre-tension towards the two poles of the battery. At the same time, the one contact element leg opposite the opening biases the inserted battery out of the chamber when the cover is opened so that no battery drawer is required, which produces a considerable space saving. In addition, the other contact element, which is insulated from the V-shaped contact spring and is arranged thereon, may be very small and need not be made of a resilient material since the V-shaped contact element generates the required contact pressure on both battery poles, which may be constituted by the battery casing and battery cover inserted therein, respectively. With such button batteries, as commonly used in hearing aids, the contact arrangement of the present invention has the further advantage that the wrong insertion of the battery between the spring legs of the V-shaped contact element only leads to the failure of the contact elements to conduct a voltage from the battery. The contact arrangement can never produce false poling of the battery since the wrong battery insertion will merely cause the two contacts to contact the same pole. Therefore, there is no need in the hearing aid circuit to provide circuit elements designed to prevent false poling.

BRIEF DESCRIPTION OF THE DRAWING

The above and other objects, advantages and features of this invention will become more apparent from the following detailed description of certain now preferred embodiments thereof, taken in conjunction with the accompanying, partially schematic drawing wherein.

DETAILED DESCRIPTION OF THE PREFERRED EMBODIMENTS

Figure 1:
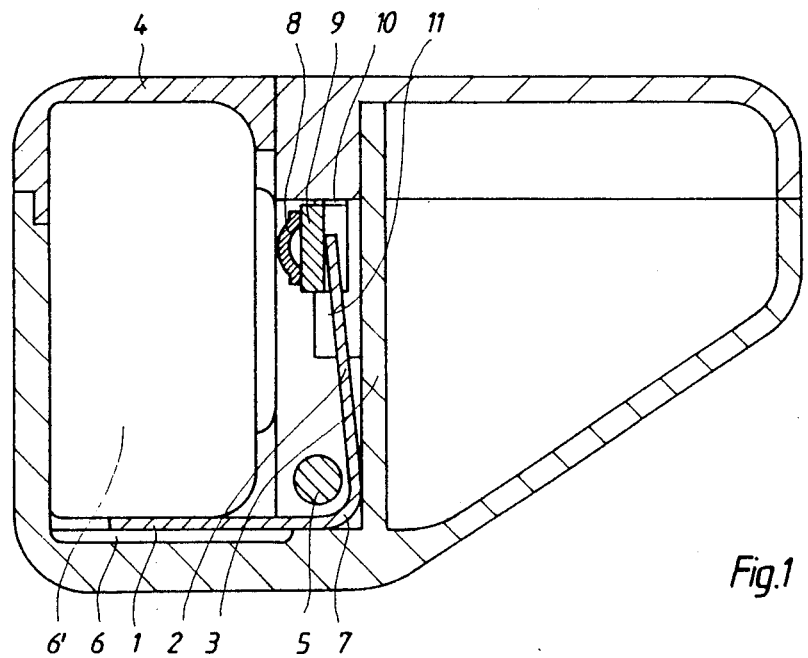
FIG. 1 shows a diagrammatic cross section of an in-ear hearing aid housing including a cover defining a battery chamber.
Figure 2:
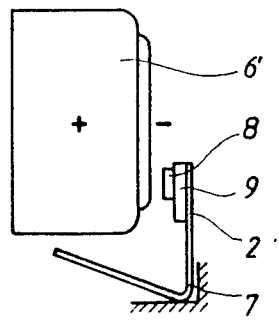
FIG. 2 schematically illustrates the insertion of a button battery.

In the drawing, like reference numerals designate like parts in all figures, different embodiments of such like parts being indicated by primes or double primes. Referring first to FIG. 1, there is schematically shown a housing including cover 4 hinged to the housing, the housing and cover defining battery chamber 6 having an opening closable by the cover. Chamber 6 has dimensions substantially corresponding to the dimensions of button battery 6' received in the chamber through the opening thereof. As shown in FIG. 2, the battery has a negative pole and a positive pole. In the illustrated embodiment, the negative pole of the battery is constituted by its casing and the positive battery pole is constituted by a battery cover inserted in the battery casing. The illustrated contact arrangement comprises two contact elements 7 and 8 arranged within battery chamber 6 to contact the battery poles. One of the contact elements is a pre-tensioned V-shaped spring 7 having two legs 1 and 2 arranged to be pressed apart against the tensioning bias of the spring by battery 6' upon insertion of the battery into chamber 6 through the opening thereof, one of the spring legs 1 being arranged opposite the opening and biasing the inserted battery into a predetermined position in the chamber. The other contact element 8 is arranged in the range of a free end of the other spring leg 2 and is insulated therefrom.

According to a preferred feature of the invention, the two spring legs 1, 2 of V-shaped spring 7 enclose an angle of 75° to 85° when biased apart by the inserted battery. With a proper selection of the spring material, this ensures a relatively high contact pressure while also assuring that the battery will be thrown out of chamber 6 automatically under the spring bias of contact element leg 1 when hinged cover 4 is opened.

In the illustrated embodiment, battery chamber 6 has a bottom opposite housing cover 4 and further includes dividing wall 3 extending from the bottom towards the housing cover to form one wall of the chamber, the one spring leg 1 being positioned adjacent the chamber bottom and the other spring leg 2 extending along the one chamber wall 3.

As shown, insulating body 9 is arranged between other contact element 8 and the free end of the other spring leg 2 of the one V-shaped contact element 7 to insulate the one from the other contact element. The insulating body may consist of an elastically yieldable material, such as pressboard or the like.

The one chamber wall 3 has hook-shaped elements 11 projecting therefrom into chamber 6 and defining slots 10. Hook-shaped elements 11 preferably have gliding surfaces serving to guide battery 6' into chamber 6 when inserted through the opening thereof. At the same time, projecting contact element mounting elements 11 may be so dimensioned that the button battery, in which the battery cover usually axially extends beyond the casing, can be inserted into chamber 6 only in a predetermined position, as illustrated, where the chamber has dimensions substantially corresponding to those of the battery.

As shown in FIG. 1, leg 1 of contact element 7 is in contact with the casing (positive pole) of battery 6' and its other leg 2 biases the other contact element 8 against the axially projecting cover of the battery (negative pole). Thus, when the battery is inserted in the manner illustrated in FIG. 2, contacts 7 and 8 will properly conduct the voltage from the battery. As this figure shows, insertion of battery 6' into chamber 6 will press the one leg 1 of V-shaped contact element 7 down against its built-in bias so that the spring legs will be pressed apart or expanded and the other leg 2 will be pressed against the negative battery pole. On the other hand, when cover 4 is opened, spring leg 1 will propel the battery through the opposite opening of chamber 6 so that the battery may be readily removed. Thus, no battery drawer is needed and considerable space is saved.

Figure 3:
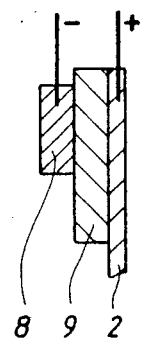
FIG. 3 is an enlarged, fragmentary cross section showing the arrangement of the other contact element on the other leg of the one V-shaped contact element.

As shown in the embodiment of FIG. 3, insulating body 9 may be affixed directly to the free end of the other leg 2 of the one contact element 7, for instance by an adhesive, and the other contact element 8 may be mounted on the insulating body.

Contact elements 7 and 8 are connected to terminals (not shown) leading to the operating parts of the hearing aid. To prevent V-spring 7 from falling out of battery chamber 6, holding pin 5 is mounted in the battery chamber to extend transversely of the V-spring along its apex but this pin must be so arranged that it does not interfere with the movement of the V-spring. However, such a holding pin may be omitted in the embodiments of FIGS. 4 to 6 wherein contact element 7 is securely held in slots 10 of hook-shaped elements 11 on dividing wall 3. In this case, the entire contact arrangement is securely held in battery chamber 6 when hinged cover 4 is closed, the hinged cover having a transverse ledge, as shown in FIG. 1, pressing against the upper ends of hook-shaped elements 11 and thus securely holding the lateral arms 12, 12', 12" in slots 10.

Figure 4:
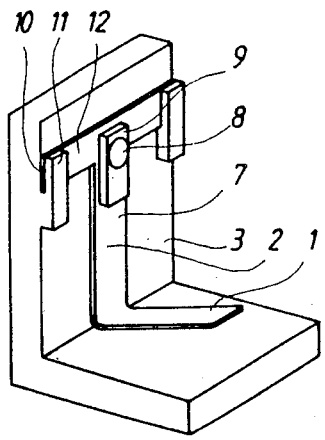
FIGS. 4 to 6 are perspective views showing three different embodiments of the contact arrangement.

In the embodiment of FIG. 4, the other spring leg 2 of V-shaped contact spring 7 has laterally extending arms 12 received and held loosely in the hook-shaped elements. When battery 6' is inserted in chamber 6 and hinged cover 4 has been closed, arms 12 will bulge out at spring leg 2 because of the pre-tension built into contact spring 7 so that the other contact element 8 will be propelled into firm contact with the pole of battery 6' in a plane extending parallel to the other spring leg 2, which is received and held in the slots 10 of hook-shaped elements 11.

Figure 5:
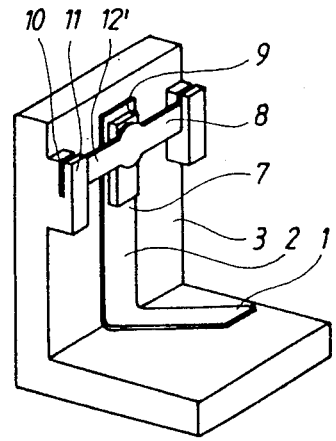

In the embodiment of FIG. 5, the other contact element 8' has laterally extending arms 12' received and held in slots 10 of hook-shaped elements 11, the arms of the other contact element being resilient so that they may be elastically bent out of their plane in the same manner as arms 12. The contact element 8' may be a lose part not connected to the one contact element 7 and insulated therefrom by insulating body 9 bonded to leg 2 of V-spring 7. On the other hand, if desired, contact element 8' may also be bonded to the insulating body. In either case, the spring force of the one contact element 7 will bulge the other contact element 8 into contact with the battery pole adjacent thereto.

Figure 6:
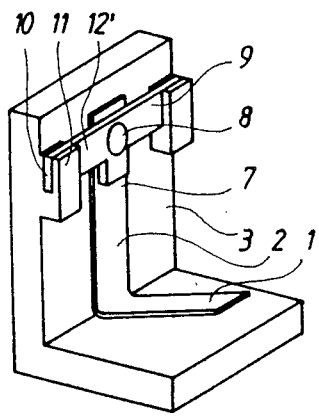

In the embodiment of FIG. 6, insulating body 9' is an elastically yielding element projecting laterally with its arms 12" from the one contact element 7 in a plane extending parallel to the other spring leg 2 thereof, the insulating element being received and held in hook-shaped elements 11. The other contact element 8 is carried by elastically yielding insulating body 9', and when battery 6' is inserted in chamber 6 and cover 4 is closed, the insulating body bulges out towards the adjacent pole of the battery and contact element 8 contacts the battery pole.

Hook-shaped elements 11 could also be arranged at the edge of substantially parallelepiped chamber 6, the cross section of the battery chamber corresponding substantially to that of the battery. This provides a favorable arrangement with respect to the easy bending of elastically yielding arms 12, 12' or 12" upon closure of cover 4 so that the other contact is firmly pressed against the adjacent battery pole. Furthermore, these hook-shaped elements may be so dimensioned that their width corresponds substantially to the thickness of the annulus remaining between the axially projecting battery cover forming the pole and the circumferential surface of the battery casing. This will prevent the possibility of wrongly inserting the battery in the chamber.

In all the hereinabove described embodiments, the V-shaped contact spring is securely held, while the mobility of the one leg of this one contact element is maintained.

Figure 7:
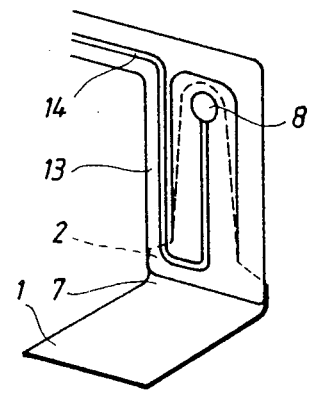
FIG. 7 is a fragmentary perspective view of still another embodiment.

In the embodiment illustrated in FIG. 7, the other contact element comprises flexible printed circuit board 13 and contact point 8' arranged on the printed circuit board and the printed circuit board is held on the other leg 2' of the one contact element 7' whose one leg 1' forms a V-shaped contact element with the other leg. The printed circuit board carrying terminal 14 connected to the contact point or being integral therewith, contact point 8 and terminal 14 constituting a conducting path. The contact point is preferably surface treated.

The other contact element may, in this embodiment, be simply bonded to the other leg of the one contact element with a suitable adhesive, this arrangement having the advantage that the terminal may be integrally formed with the other contact element. Furthermore, this arrangement provides a particularly compact battery chamber, since it requires no space for the connection of the other contact element to its terminal, for example, a soldering spot or the like. Flexible printed circuit board 13 enables terminal 14 to be simply laid and, if desired, it may be in loose contact with contact element 7'.

What is claimed is:

1. In a housing including a cover, the housing and cover defining a battery chamber having an opening closable by the cover, the chamber having dimensions substantially corresponding to the dimensions of a button battery to be received in the chamber through the opening thereof, and the battery having a negative pole and a positive pole: a contact arrangement comprising two contact elements arranged within the battery chamber to contact the battery poles,
   (a) one of the contact elements being a pre-tensioned V-shaped spring having two legs arranged to be pressed apart against the tensioning bias of the spring by the battery upon insertion of the battery into the chamber through the opening thereof, one of the spring legs being arranged opposite the opening and biasing the inserted battery into a predetermined position in the chamber, and
   (b) the other contact element being arranged in the range of a free end of the other spring leg and insulated therefrom.

2. In the housing of claim 1, wherein one of the battery poles is constituted by a casing for the battery and the other battery pole is constituted by a cover therefor.

3. In the housing of claim 1, the two spring legs of the V-shaped spring enclosing an angle of 75° to 85° when biased apart by the inserted battery.

4. In the housing of claim 1, the battery chamber having a bottom opposite the housing cover and further including a dividing wall extending from the bottom towards the housing cover to form one wall of the chamber, the one spring leg being positioned adjacent the chamber bottom and the other spring leg extending along the one chamber wall.

5. In the housing of claim 4, wherein the one chamber wall has hook-shaped elements projecting therefrom into the chamber and the other spring leg has laterally extending arms received and held in the hook-shaped elements.

6. In the housing of claim 5, wherein the hook-shaped elements have gliding surfaces serving to guide the battery into the chamber when inserted through the opening thereof.

7. In the housing of claim 1, an insulating body arranged between the other contact element and the free end of the other spring leg.

8. In the housing of claim 7, wherein the one chamber wall has hook-shaped elements projecting therefrom into the chamber and the other contact element projects laterally from the one contact element in a plane extending parallel to the other spring leg thereof, the other contact element being received and held in the hook-shaped elements.

9. In the housing of claim 7, wherein the one chamber wall has hook-shaped elements projecting therefrom into the chamber and the insulating body is an elastically yielding element projecting laterally from the one contact element in a plane extending parallel to the other spring leg thereof, the insulating element being received and held in the hook-shaped elements.

10. In the housing of claim 1 wherein the other contact element comprises a printed circuit board and a contact point on the printed circuit board, the printed circuit board carrying a terminal connected to the contact point and constituting a conducting path.

11. In the housing of claim 10, wherein the printed circuit board is flexible.

12. In the housing of claim 10, wherein the contact point is surface treated.

* * * * *